Oct. 8, 1935.  B. FRANK  2,016,632
POWER TRANSMISSION SYSTEM
Filed June 28, 1932    4 Sheets-Sheet 1

B. Frank
INVENTOR

By: Marks & Clerk
ATTYS.

Oct. 8, 1935.  B. FRANK  2,016,632

POWER TRANSMISSION SYSTEM

Filed June 28, 1932    4 Sheets-Sheet 2

B. Frank
INVENTOR

By Marks & Clerk
Attys.

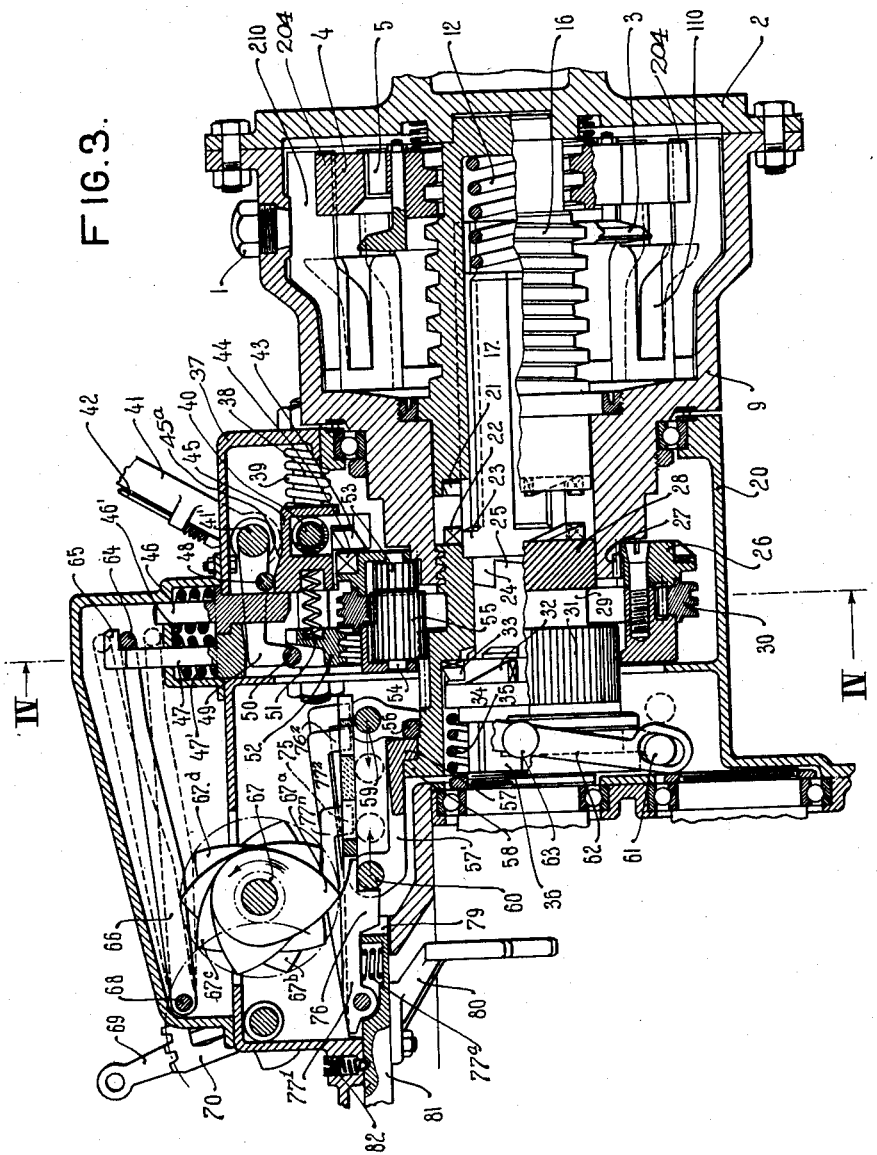

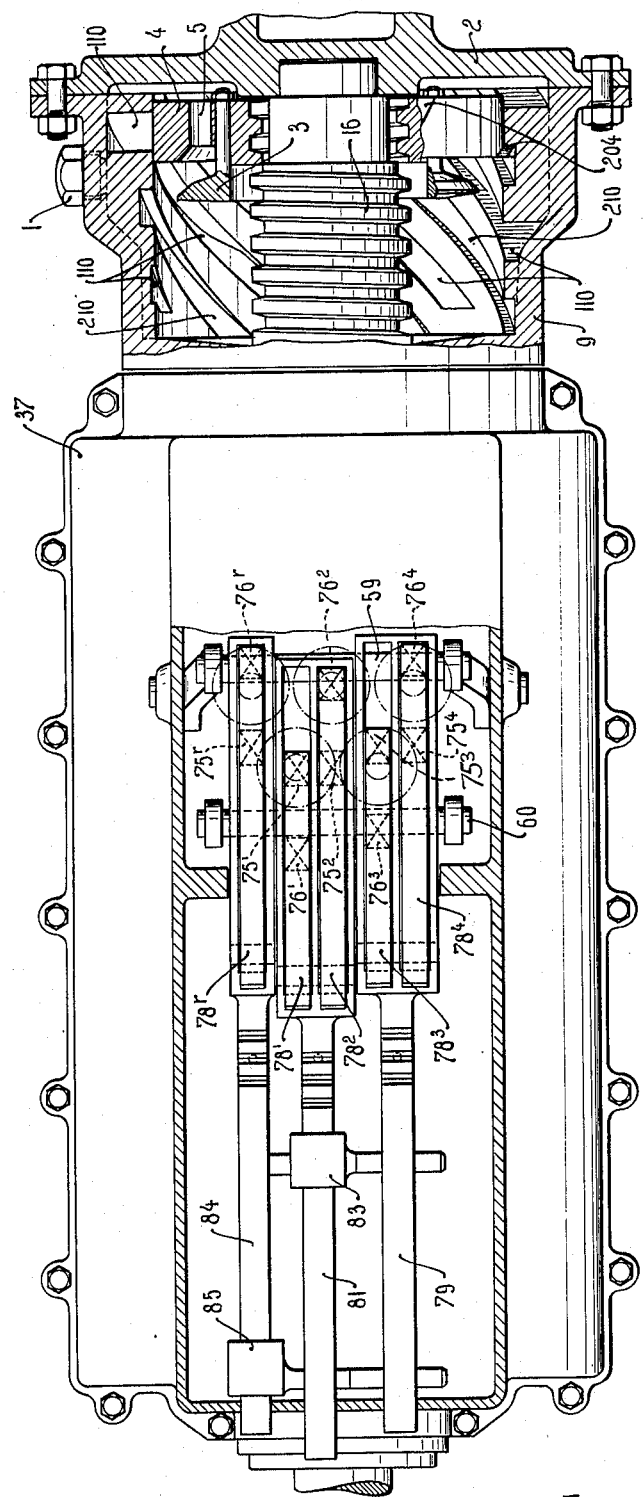

Patented Oct. 8, 1935

2,016,632

UNITED STATES PATENT OFFICE 2,016,632

POWER TRANSMISSION SYSTEM

Benjamin Frank, Bandoeng, Java, Dutch East Indies

Application June 28, 1932, Serial No. 619,749 In the Netherlands March 1, 1932

7 Claims. (Cl. 192—35)

This invention relates to an improved coupling mechanism.

The main object of the invention is a mechanism whereby a driving and a driven element can be coupled to and uncoupled from each other smoothly and without shocks.

An essential feature of the coupling in accordance with the invention is, that the driving and the driven element are each constrained to rotate positively with individual screw threads adapted during coupling to engage each other, one of the said elements being provided with a totally closed cylinder filled with a suitable liquid and cooperating with an axially movable piston, which is fitted with the male or the female screw thread with which one of said elements is constrained to rotate, and adapted, on the angular speed of the one thread exceeding that of the other, to move axially in the cylinder and, during the coupling operation, thereby brought about, to gradually close the free passage for the liquid from one side of the piston to the other. The cylinder wall is preferably provided internally with axial grooves, the depth of which gradually decreases towards the end of the cylinder.

During the coupling operation, the liquid trapped by the piston acts as a hydraulic shock absorber, so that said operation takes place very smoothly and without shocks.

Although the invention is primarily intended for motor vehicles, it is by no means limited thereto, as it can be applied with equal advantage to the propeller shaft of vessels, to transmission gear, for instance, for machine-tools, etc.

Figure 1:
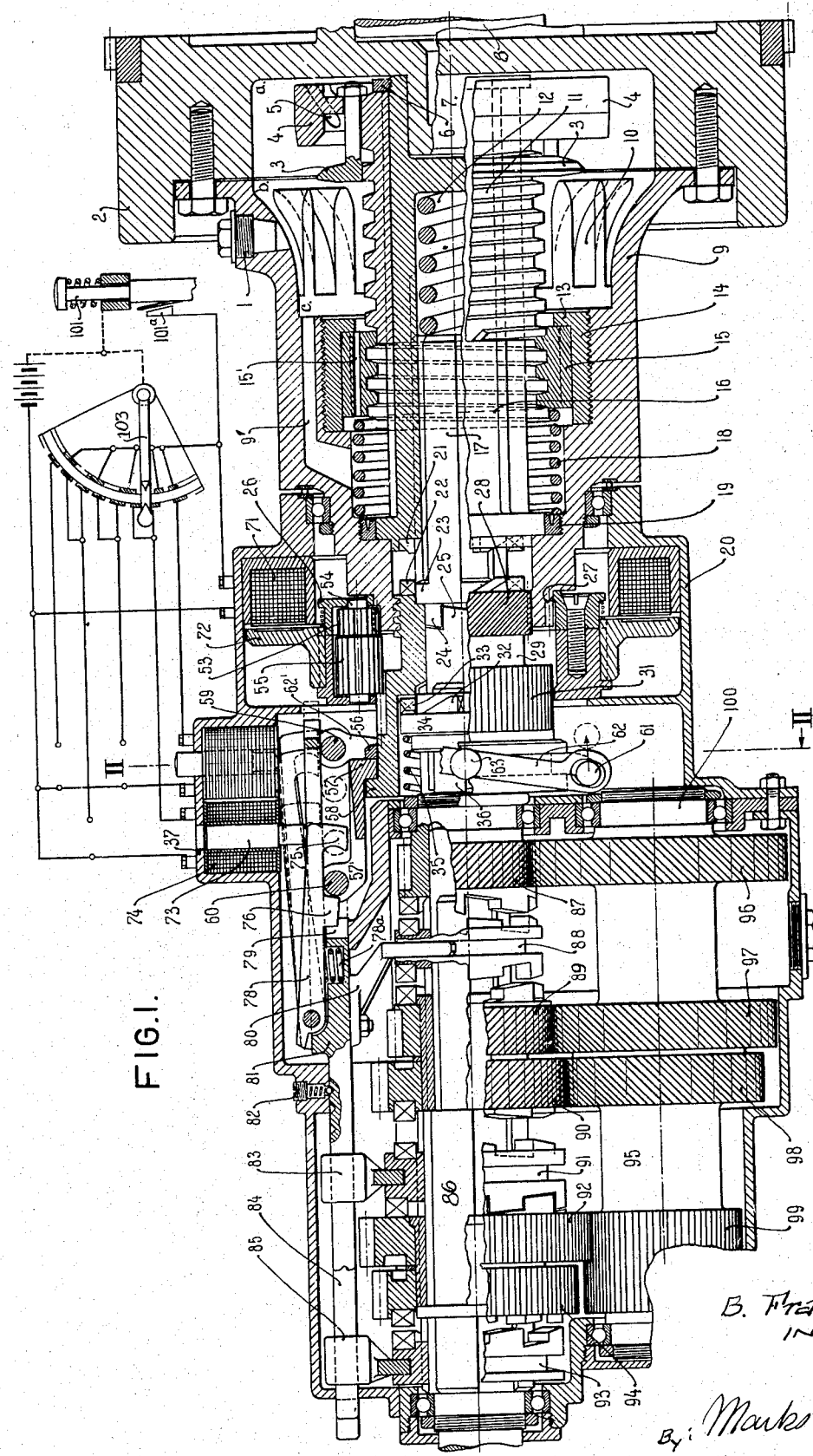
Figure 2:
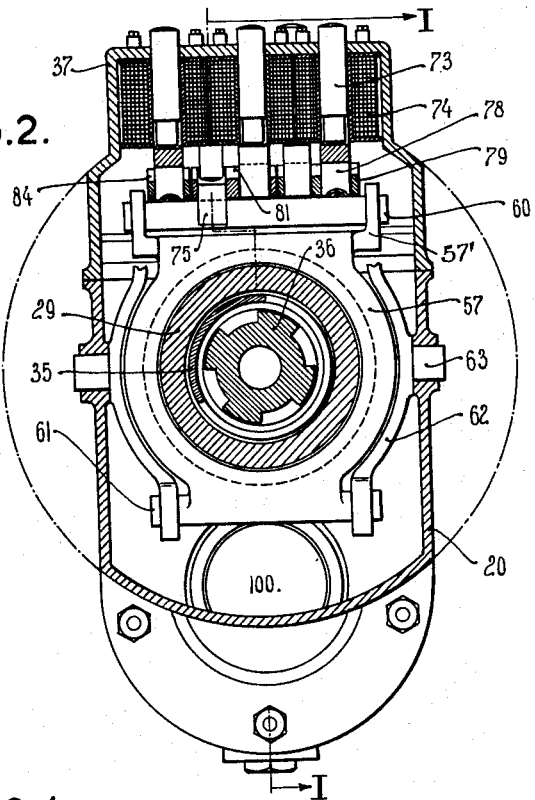
Figure 4:
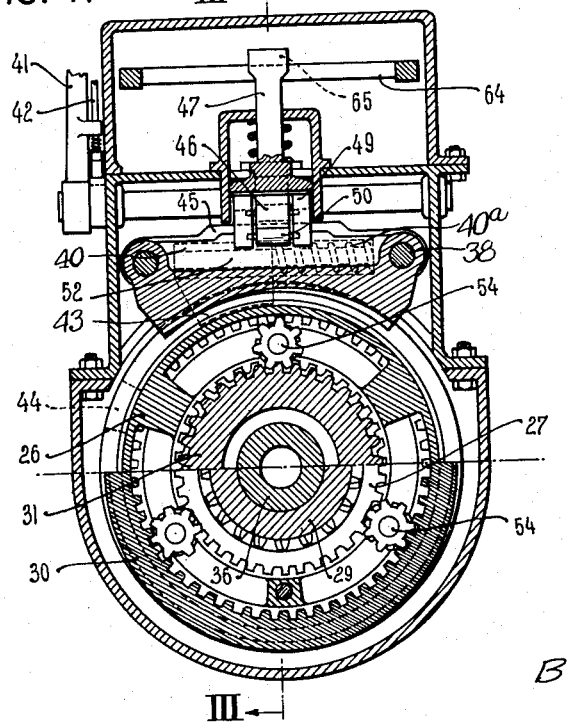

The invention will now be described in further detail with reference to the annexed drawings, which illustrate some embodiments thereof and in which:

Fig. 1 is a longitudinal sectional view of a semi-automatic change-speed gear for a motor vehicle, including a coupling with hydraulic shock absorber, and electromagnetic operating mechanism, Fig. 2 is a cross sectional view along the line II—II in Fig. 1, Fig. 3 is a longitudinal sectional view of a somewhat modified coupling, including a mechanical operating and gear changing mechanism, Fig. 4 is a cross sectional view along the line IV—IV in Fig. 3, Fig. 5 is a plan view of the change speed gear mechanism according to Figs. 1 and 2, including a coupling of modified construction, certain parts being shown in section for the sake of clearness.

The coupling shown in Figs. 1 and 2 comprises a cylinder 9 closed by a cover 2, which is bolted thereto so as to ensure a perfectly tight joint, and formed as a flywheel of the motor of the vehicle, to which the coupling is applied. The cover 2 is keyed or otherwise fixedly secured to the driving shaft 8 and provided on its inner face with a boss 7, which projects into an axial recess in the end face of a hollow shaft 16 and forms a journal for said shaft.

The cylinder 9 is provided with a filling aperture tightly closed by a screw plug 1. The reduced left hand side neck portion of the cylinder 9 forms a bearing for the left hand side end of the hollow shaft 16, the end face of which is fitted with bevelled dogs or teeth 21. The tightness of the joint between the cylinder 9 and the hollow shaft 16 is ensured by a gasket 19.

The neck of the cylinder 9 is provided externally with a gear rim 27 and internally with a female screw thread, which has a pitch of 45° and engages with the male thread 28 on a socket 29.

On its outer cylindrical face, the hollow shaft 16 has longitudinal splines engaging with corresponding grooves or slots in an annular member adapted for sliding movement over said shaft and composed of an externally threaded sleeve 11 integral with a piston 4. Consequently, sleeve 11 and piston 4 are constrained to rotate positively with shaft 16. The piston 4 has a plurality of passages 5 adapted to be sealed by a common valve disk 3.

Screwed within the reduced central portion of cylinder 9 is a bush 14 having axial grooves in its inner face and mounted on corresponding splines formed on a nut member 15, which has freedom of axial movement within narrow limits. It will thus be understood that the nut member 15 is constrained to rotate positively with the bush 14 and with the cylinder 9.

A coil spring 18 tends to urge the flanks of the thread of nut 15 into contact with those of sleeve 11, a collar 13 on the right hand side end of bush 14 limiting the axial movement of the nut 15 to the right.

The nut member 15 and the wall of cylinder 9 are provided with a plurality of axial passages 15' and 9', respectively, providing for a free communication between the cylinder spaces on either side of said nut.

The internal diameter of the cylinder 9 between a and b exceeds the external diameter of piston 4. The next cylinder portion between b and c, with which the piston 4 has a sliding fit, is provided on its inner wall with a plurality of grooves 10, the depth of which gradually decreases towards the left, so that at c the bottoms of said grooves are substantially flush with the inner cylinder wall.

The wall of the bore of the hollow shaft 16 is axially grooved, said grooves engaging with mating splines formed on a coupling shaft 17 adapted for sliding movement under the thrust of a coiled spring 12 housed within said bore and bearing against the bottom thereof. That portion of the coupling shaft 17, which projects from the bore of hollow shaft 16, has a collar 23 and dogs or teeth 24, adapted for coaction with similar dogs 25 on the right hand side end face of the driven shaft, designated by 36.

The driven shaft 36 is supported by suitable bearings of the stationary casing or housing 20 and furnished with axial splines engaging corresponding grooves in the inner wall of a sleeve 34. Thus, said sleeve 34, the right hand side end face of which is fitted with teeth 32, is adapted for axial sliding motion over shaft 36 by the thrust of a coiled spring 35.

The collar 23 of coupling shaft 17 bears against a shoulder on the right hand side end face of the socket 29, which face is provided with dogs 22 adapted for cooperation with the teeth 21 of the hollow shaft 16. On the left hand side of the screw thread 28, the socket 29 has a somewhat reduced outer diameter, the next portion to the left, which has an increased diameter, being fitted externally with a gear rim 31 and internally with dog clutch teeth 33 adapted to engage the teeth 32 of sleeve 34. On its left hand side, the socket 29 has a collar 58 and spaced therefrom a nut 56, between which parts a freely rotatable ring 57 is mounted so as to be locked against axial displacement relative to the socket.

The diameter of gear rim 27 exceeds that of gear rim 31. Both rims act as sun wheels of a planetary gear, which comprises planet wheels rotatably mounted within a casing 26.

Each planet wheel comprises a relatively small spur gear 53 meshing with the sun wheel 27, and a relatively large spur gear 55 cooperating with the sun wheel 31 of the socket 29, which is arranged for axial sliding movement so as to remain in mesh with the spur gear 55.

Mounted around casing 26 is an annular armature 72 splined thereon but having freedom of a small axial displacement relative thereto. Said armature coacts with an annular magnet 71 adapted to be energized on depression of a spring loaded switch button 101.

The ring 57 serves for throwing in and throwing out the spur wheels of the variable-speed gear mechanism. For this purpose, it is provided at its top with two lugs 57' through which a cross rod 60 is passed, and at its bottom with trunnions 61. These trunnions are engaged by a fork 62 provided with trunnions 63 by means of which it is pivotally mounted in bearings of the stationary casing or housing 20. At its top, said fork 62 has two lugs 62' engaged by a cross rod 59 in parallel relation with rod 60.

The left hand end of the intermediate shaft 36 is hollow and is fitted externally with a gear rim 87. The variable speed gear mechanism proper comprises a plurality of spur wheels 89, 90, 92, 94, which are freely revoluble on the driven shaft 86, the right end of which is supported in the hollow end of the shaft 36. Gears 87, 89, 90 and 92 are in permanent mesh with gears 96, 97, 98 and 99, respectively, which are keyed on a countershaft 100. Gear 94 meshes with a reversing spur gear (not shown), which itself is in permanent mesh with the gear 99.

On the driven shaft 86 are mounted for axial sliding movement three grooved clutch rings 88, 91, 93 constrained to rotate positively with said shaft and adapted to be actuated by rods 79, 81, 84, respectively, which are slidable in the casing 20.

Secured to said rods are actuating forks 80 (for the 4th and the 3rd speed), 83 (for the 2nd and the 1st speed), and 85 (for the reverse), respectively. Furthermore, said rods are each provided with one or two pawls, each loaded by a spring 78ª tending to urge it into inoperative position. Mounted in the wall of casing 20 are three spring loaded pins 82 adapted to cooperate with notches in the rods 79, 81, 84, so as to retain these in their operative positions in a manner well known.

It is to be understood that each of the rods 79 and 81 has two pawls 78⁴, 78³, 78², and 78', one for the 4th and 2nd speed, respectively, and one for the 3rd and 1st speed, respectively. Rod 84, however, is furnished with one pawl 78ʳ only.

Each of said pawls 78'—78⁴ has two projections 75', 76' 75², 76², 75³, 76³ and 75⁴, 76⁴, respectively, for engagment with the cross rod 59, or with the cross rod 60 as the case may be said rods being adapted to move towards or away from one another when the socket 29 with the ring 57 is axially displaced.

The pawls 78'—78⁴ are adapted to be depressed by the thrust of the soft iron cores 73 of coils 74, when the latter are energized.

The modus operandi of the coupling mechanism will now be described.

For uncoupling the driven element from the driving element the operator depresses button 101 so as to close the contact 101a, whereby magnet 71 is energized and armature 72 attracted, so that the casing 26 is braked and arrested.

With the casing 26 locked against rotation, the planet wheels 53, 55 are constrained to rotate about their axes. Gears 27, 31, which, till now, rotated at equal angular speeds, are thus caused to revolve at different speeds, the speed of gear 31 exceeding that of gear 27.

Owing thereto, screw 28 will assume a greater angular speed than has the nut formed by the neck of cylinder 9, since the latter continues to rotate at a substantially constant speed. As a consequence, screw 28 is moved axially relative to its nut, i. e. socket 29 moves towards the hollow shaft 16. In doing so, the socket urges the coupling shaft 17 to the right, so that said shaft is moved further into the hollow shaft 16, thereby compressing spring 12.

It is pertinent here to remark that, as long as the coupling is thrown in, piston 4 assumes its extreme position to the left, so that its screw 11 fully engages nut 15 and the system 17, 16, 11, 4 is constrained to rotate positively with cylinder 9. As soon as the socket 29 moves to the right, the dog clutch teeth 24 disengage the teeth 25, so that the driven shaft 36 is released from the coupling shaft 17. The socket 29 will then continue its axial movement, until the teeth 22 engage the teeth 21, whereby to shaft 16 and, consequently, also to sleeve 11 with piston 4 the same angular speed is imparted as has the socket 29. Ultimately, screw 28 fully disengages the nut provided in the neck of cylinder 9.

As long as casing 26 is arrested, gear 31 and socket 29 will rotate in the same direction as, but at a greater angular speed than do gear 27 and cylinder 9. Thus, piston 4 and sleeve 11 will also turn in the same direction as, but faster than does cylinder 9 with the nut member 15. The sleeve 11 is thereby screwed out of nut member 15, so that piston 4 moves to the right, i. e. towards the cylinder cover 2.

During this outward movement of piston 4, the liquid, with which the cylinder 9 is completely filled, will flow through the grooves 10 in the cylinder wall and also past valve disk 3 through the passages 5 in piston 4. This outward movement of piston 4 will continue until sleeve 11 has fully disengaged nut member 15 and piston 4 abuts against nut 6, when piston 4 is permitted to rotate freely.

When the shaft 36 is to be coupled to the driving shaft 8, then the circuit of magnet 71 is again interrupted, whereby armature 72 is released and again with the casing 26 permitted to rotate.

Since the casing 26 is now again released, the planet wheels 53, 55 will no longer rotate about their own axes, so that the angular speed of sun wheel 31 no longer exceeds that of sun wheel 27. Coupling shaft 17 tends to push socket 29 to the left, under the thrust of spring 12, so that the thread of screw 28 again engages the nut in the neck of cylinder 9.

The socket 29 will, under these circumstances, rotate slower than cylinder 9, until screw 28 again fully engages its nut and socket 29 has returned into its initial position. Only then socket 29 will again revolve with the same angular speed as cylinder 9.

Meanwhile coupling shaft 17, which, with hollow shaft 16 and piston 4 in its extreme right hand position, is rotating at the same angular speed as cylinder 9, moves under the thrust of spring 12 to the left until it clutches the intermediate shaft 36. Owing to the load acting thereon, the driven shaft at that moment is stationary; anyhow its angular speed is smaller than that of shaft 17. If, now, the teeth 24 and 25 engage one another, the coupling shaft 17 with associate parts 16 and 4 will be braked by the driven shaft. Cylinder 9, however, continues its rotation and the nut member 15, which is permanently urged into contact with the thread of sleeve 11 under the thrust of spring 18, will be screwed upon the stationary or slowly revolving sleeve 11, so that piston 4 is moved to the left.

On its way to the left, the piston 4 will displace the liquid, which now can escape only through the grooves 10 in the inner cylinder wall, since valve 3 has closed the passages 5 under the action of the liquid pressure As the piston moves on, the liquid offers an increasing resistance, because the depth of said grooves decreases. The shock produced by the throwing in of the coupling is transmitted by the piston 4 to the liquid, and as the resistance of the liquid gradually increases, this shock will be gradually absorbed.

The increasing resistance encountered by the piston 4 on its way to the left causes sleeve 11 to be rotated, by the revolving nut member 15, in the same direction as cylinder 9. So, on its way from b to c the piston will simultaneously perform a retarded axial and an accelerated rotary movement, until the axial movement has become zero and the angular speeds of piston 4 and cylinder 9 have attained the same value. The coupling action is then completed.

It will be understood that on operation of the push button 101, the motor is thrown out, without the setting of the change-speed gear being affected, since the pawls are then not depressed. Consequently, the cross rods 59 and 60, which during the coupling operation move towards one another, cannot engage any of the projections of the pawls $78'-78^4$.

The coupling and uncoupling during gear changing is brought about by means of a handle 103 on the steering wheel.

For gear changing, the axial movement performed by the socket 29 during the coupling and the uncoupling of shafts 8 and 36 is utilized. When during uncoupling the socket 29 moves towards the right, owing to the excess of rotary speed of the sun wheel 31, ring 57 will also be moved to the right by the collar 58, whereby cross rod 60 is also forced to the right and rod 59 is moved to the left by the action of the fork 62.

By the actuation of the aforesaid handle on the steering wheel, one of the magnets 74 (Fig. 1) is energized. Owing thereto, the corresponding core 73 is urged downward, whereby the selected pawl e. g. pawl 78' is depressed and the corresponding projection 75' moved into the path of the rods 59, 60, which are moving towards each other. Thus, said rods return rod 81 into neutral position, through the projection 75' and the pawl 78', whereby the corresponding ring 91, which up till that moment clutched one of the gears 90, 92, is also moved back into neutral position.

If now by interrupting the circuit of magnet 71 the casing 26 is released during the coupling of shafts 8 and 36, whereby socket 29 and shaft 17 are again moved to the left under the thrust of spring 12, the ring 57 will also be urged to the left by the nut 56, whereby the rods 59 and 60 will move away from one another. Assuming now one of the gear selecting pawls $78'-78^4$ to be depressed, one of its projections will be engaged by one of the rods 59, 60, which are pushed away from one another by the spring 12. Thereby, the corresponding rod 79, 81 or 84 will be moved to the right or to the left and the corresponding ring 88, 91 or 93 will clutch one of the gears 87, 89, 90, 92, 94, whereby the change of gear ratio is completed.

The contacts of the operating means are so arranged that during uncoupling the circuit for one of the coils 74 is closed prior to the magnet 71 being energized,—and that during coupling (putting in of a speed) the circuit of the magnet 71 is interrupted prior to that of the coil 74. Consequently, one of the pawls $78'-78^4$ is necessarily depressed, when during coupling or uncoupling the rods 59, 60 move towards or away from one another.

The coupling shown in Figs. 3 and 4 is of simpler construction than the one in accordance with Figs. 1 and 2. Moreover, it is provided with mechanical, instead of electromagnetic operating gear.

In said construction, the piston 4 is slidable over the inner faces of splines confining grooves 110 and 210 in the inner wall of the hydraulic cylinder 9. Said piston cooperates as a nut with the externally threaded hollow shaft 16, as distinguished from the device shown in Figs. 1 and 2, in which the piston 4 is axially slidable over the hollow shaft 16 and integral with a screw cooperating with a nut 15 in cylinder 9.

Grooves 210 have a greater depth than grooves 110 and also serve to guide splines 204 of the piston 4. As shown in Fig. 5 the grooves 210 and 110 are wound along a helix having a pitch exceeding and opposite that of the thread on the hollow shaft 16. In said modification, the piston will have a tendency to be screwed to the left. If, therefore, the piston has moved to the right owing to an excess of angular speed of screw 16, the flanks of the threads on the piston will always be urged against those of screw 16, so that no special spring (18 in Fig. 1) is required. During the sliding movement of the piston, therefore, the piston 4, the cylinder 9 and the shaft 16 rotate at different speeds.

Mounted intermediate between the two parts, of which the casing 26 is composed, is a freely rotatable ring 30 provided internally with teeth meshing with those of the spur gear 55, and externally with a screw thread wound in a direction opposite that of screw 16. Moreover, casing 26 has a plurality of dog clutch teeth 44 arranged for cooperation with a stop tooth 43 adapted, against the thrust of a spring 40ª, for limited sliding motion in the direction of rotation of casing 26, over a shaft 40 secured in a block 45. Said block is provided with a cam face 45a, loaded by springs 39, and slidably mounted on two rods 38 secured to the cover 37 of the stationary casing 20.

In the position shown in Fig. 3, block 45 is locked by a latch 46, springs 39 are tensioned, and tooth 43 disengages teeth 44.

Also slidably mounted on rods 38 is a half nut 52, the thread of which is adapted to mesh with that of ring 30. A spring 51, however, tends to retain the half nut 52 out of engagement with the screw thread of said ring. The left hand side end face of nut 52 is chamfered so as to form a cam face.

Journaled in bearings of the cover 37 is a shaft 41' carrying a lever or pedal 41 provided with a spring latch 42 adapted to cooperate with a projection of cover 37. Shaft 41' further carries two levers 49, intermediate between which are supported two freely rotatable rollers 48, 50. In the illustrated, i. e. neutral position, roller 48 engages the horizontal top face of block 45, whereas the half nut 52 is urged against roller 50 by the spring 51. A latch 47, arranged for lifting latch 46, is kept in engagement with both levers 49 under the action of its spring 47', whereas a shoulder of latch 46 is pressed in downward direction, by a spring 46', on the top face of cover 37.

Latch 47 has a lateral projection 65 for engaging a horizontal cross rod 64 mounted between two lever arms 66.

The rod 81 is provided with three pawls 77', 77n, 77², viz, for the 1st speed, for neutral and for the 2nd speed, respectively, whereas rod 79 is also fitted with three pawls, viz, for the 4th speed, for neutral and for the 3rd speed, respectively. Rod 84, however, is furnished with only two pawls, for neutral and for the reverse, respectively.

By rotation of a cam shaft 67, cams 67a, 67b, 67c, etc. mounted thereon act upon the corresponding pawls so as to depress them. If a neutral pawl is depressed, the levers 66 are lifted by a special cam arranged on the cam shaft 67 diametrically opposite each of the neutral cams.

The levers 66 are rotatable about a shaft 68 and adapted to lift the latch 47 owing to the cooperation of its lateral projection 65 with cross rod 64.

Rotation of the cam shaft 67 is brought about by a lever 69 cooperating with a toothed segment 70 in mesh with a pinion on the cam shaft 67, the ratio between the diameters of the pitch circles of said pinion and said segment being such as to cause a full revolution of cam shaft 67 when lever 69 is turned through about 90°.

Lever 69 is adapted to be operated by a handle on the steering wheel of the motor vehicle.

Fig. 1 of the drawings represents the position of the parts when the vehicle is at rest and the driven shaft 36 has been uncoupled from the driving shaft 8. As shown the piston 4 assumes its extreme right hand position and the screw 11 is completely disengaged from the nut 15. The screw 28 is in full engagement with the nut formed by the neck of cylinder 9.

The modus operandi of the embodiment according to Figs. 3 and 4 will now be described.

For uncoupling the driven element from the driving element, lever 41 (Fig. 3) is depressed so as to be locked by the spring latch 42. Thereby, the levers 49 lift the latch 47 and, consequently, also latch 46, so that block 45 is released and permitted to move to the left under the thrust of springs 39. Tooth 43 is now adapted to engage one of the teeth 44 of casing 26, which rotates at the angular speed of cylinder 9, that is to say, of the driving shaft 8. Initially, tooth 43 is moved, against the thrust of its spring, over shaft 40 in the direction of rotation of casing 26, whereby the shock is absorbed. Thereupon, casing 26 is braked by tooth 43 and arrested.

As described above with regard to the embodiment according to Figs. 1 and 2 screw 28 will now assume a greater angular speed than has the cylinder 9, so that piston 4 moves to the right, and this outward movement continues until the piston has fully disengaged the screw thread on shaft 16, whereby the uncoupling action is completed.

When the driven shaft 36 is to be coupled to the driving shaft 8, lever 41 is unlatched. As will be understood, the block 45 at that moment is still kept in its extreme left hand side position under the thrust of springs 39, and tooth 43 still engages one of the teeth 44 of casing 26. Owing now to the rotation of lever 41 in anticlockwise direction, levers 49 are depressed and roller 50, by its cooperation with the cam face of the half nut 52, urges this nut to the right, so that the flanks of nut 52 are forced against those of ring 30. During this angular motion of levers 49, roller 48 drops into contact with the horizontal top face of block 45 at the right hand side of cam 45a.

As long as the casing 26 is arrested, the planet wheels 55—53 rotate in a direction opposite that of cylinder 9. Consequently, ring 30 will also be rotated in a direction opposite that of cylinder 9 by the spur gears 55, which mesh with the internal gear rim of said ring. The thread of ring 30 will now engage with the half nut 52 and move the latter to the right, i. e. towards the block 45. Since the half nut 52 and the block 45 are both mounted on the rods 38, ring 30 will urge both the half nut 52 and the block 45 to the right, against the thrust of springs 39, until tooth 43 disengages tooth 44. Latch 46 will then, by the action of its spring 46', drop into the space on the left hand side of block 45 so as to lock the latter. During the movement of block 45 to the right under the action of ring 30, roller 48 will ride uphill over cam face 45a and thereby lift levers 49.

Since the casing 26 is now again released, spur gears 53 and 55 will no longer turn about their own axes, so that casing 26 will rotate at the same angular speed and in the same direction as do cylinder 9 and socket 29. The same applies to ring 30. The half nut 52 will thereby be screwed off ring 30, and moved to the left, until it has fully disengaged said ring. Moreover, the half nut 52 is urged to the left by spring 51, so that it remains out of contact with ring 30.

As described above with regard to the embodiment according to Figs. 1 and 2 coupling shaft 17 is now forced to the left under the thrust of spring 12 until it clutches the intermediate shaft 36, whereby shaft 17 will be braked, so that the piston 4 will be screwed upon the stationary or slowly revolving shaft 16. The coupling action is then completed.

The coupling and uncoupling during gear changing is brought about by means of the lever cam shaft 69. By the actuation of said lever cam shaft 67 is turned and is set with one of its neutral cams pointing down, whereby the selected pawl 77n is depressed and the corresponding projection 75 moved into the path of the rods 59, 60.

If a neutral cam on shaft 67 depresses the pawl 77n another diametrically opposed cam on said shaft 67 will simultaneously lift the levers 66, whereby cross rod 64 raises the latch 47 and the uncoupling mechanism is put into operation, owing to the locking of casing 26. Rods 59, 60 will now move towards each other and return rod 81 into neutral position, through the projection 75 and the pawl 77n, whereby the corresponding clutch ring is also moved back into neutral position.

If now by further rotation of cam shaft 67 levers 66 again drop downward, levers 49 are depressed by the action of spring 47', whereby the casing 26 will be released, so that socket 29 and shaft 17 are again moved to the left under the thrust of spring 12. The ring 57 will also be urged to the left by the nut 56, whereby the rods 59 and 60 will move away from one another. Meanwhile one of the cams 67a, 67b, 67c, 67d has depressed the corresponding gear selecting pawl, which with its projection will be engaged by one of the rods 59, 60, which are pushed away from one another by the spring 12. Thereby, the corresponding rod 79, 81 will be moved to the right or to the left and the corresponding clutch ring will clutch one of the gears on the driven shaft, whereby the change of gear ratio is completed.

From the above description it will be apparent that my novel coupling is adapted to act as a freewheel. If, namely, the driven shaft 36 rotates faster than the driving shaft 8, for instance, on accidental gain of speed of the vehicle, piston 4 will unscrew from nut 15. The teeth 32 of the sleeve 34 are beveled in such a manner that they then engage the teeth 33 of the socket 29, under the thrust of spring 35, whereby the said socket also begins to rotate faster than cylinder 9, the consequence being that the screw 28 is unscrewed from its nut, coupling shaft 17 is urged to the right, and the dogs 22 of screw 28 ultimately engage the hollow shaft 16 with associate parts, i. e. piston 4 with screw 11. Thus, as long as shaft 36 rotates faster than cylinder 9, freewheeling will occur. When the fuel valve of the motor is closed, cylinder 9 may even remain stationary, while shaft 36 continues its rotation.

In motor vehicles, the use of the described power transmission system has, amongst others, the advantage of very economical consumption of fuel and lubricant, especially in busy traffic, another advantage being that during slowing down vibration of the motor is avoided, as on closure of the fuel valve the driven shaft is immediately released from the motor, so that the crank shaft need not under all conditions follow the driven shaft.

The provision of the sleeve 34 makes it possible to establish a connection between the driven shaft 86 and the driving cylinder 9, so that the braking power of the motor can be utilized, after closure of the fuel valve, for retarding the driven shaft. To this end, in the arrangement shown in Figs. 3 and 4, the lever 41 should be depressed and, if necessary, latched, whereas with the construction illustrated in Figs. 1 and 2 button 101 should be depressed, or the circuit of magnet 71 should be closed by means of a special switch. By these means, the casing 26 is braked and arrested so as to establish a connection between the rotating shaft 36 and the braking cylinder, via the sun wheels 27, 31 and the planet wheels 55—53, since socket 29 is engaged by sleeve 34. Under these conditions, the braking power of the motor is transmitted to shaft 36 in a ratio responsive to the speed ratio between wheels 31 and 27.

What I claim is:—

1. In means for coupling a driving element with a driven element; a totally closed cylinder secured to the driving element and provided internally with a female thread, an annular piston working in said cylinder, a male thread provided on the outer side of the piston and cooperating with the female thread of the cylinder, a female thread provided on the inner side of the piston and having a pitch smaller than and opposite that of the female thread of the cylinder, a male thread adapted to rotate positively with the driven element and to cooperate with the female thread of the piston, a passage adapted to ensure communication between the space on either side of the piston, and a mass of liquid completely filling up the cylinder, the cross sectional area of said passage being adapted to be gradually reduced on axial movement of the piston during the coupling operation when the female thread of the piston engages the male thread on the driven element.

2. In means for coupling a driving element with a driven element, a male screw thread adapted to rotate positively with a hollow shaft, a female screw thread adapted for cooperation with said male thread and to rotate positively with the driving element, a totally closed cylinder secured to the driving element and revoluble relative to said hollow shaft, a piston carrying one of said screw threads and axially movable in said cylinder on rotation of said screw threads relative to one another, a coupling shaft located within said hollow shaft and adapted for axial sliding movement therein but prevented from rotation relative thereto, resilient means interposed between said hollow shaft and said coupling shaft, means for coupling said coupling shaft with said driven element, a passage adapted to ensure communication between the spaces on either side of the piston, and a mass of liquid completely filling up said cylinder, the cross sectional area of said passage being adapted to be gradually reduced on axial movement of the piston during the coupling operation.

3. In means for coupling a driving element with a driven element, a male screw thread adapted to rotate positively with a hollow shaft, a female screw thread adapted for cooperation with said male thread and to rotate positively with the driving element, a totally closed cylinder secured to the driving element and revoluble relative to said hollow shaft, a piston carrying one of the said screw threads and axially movable in said cylinder on rotation of said screw threads relative to one another, a second female screw thread provided on the cylinder, a coupling shaft located within said hollow shaft and adapted for axial sliding movement therein but prevented from rotation relative thereto, resilient means interposed intermediate between said hollow shaft and said coupling shaft, means for coupling said coupling shaft with said driven element, a socket mounted for rotation on the driven element and adapted on axial movement to uncouple the driven shaft from the coupling shaft, a male screw provided on said socket and cooperating with the said second female thread of the cylinder, means for coupling said socket with said hollow shaft, a passage adapted to ensure communication between the spaces on either side of the piston, and a mass of liquid completely filling up said cylinder, the cross sectional area of said passage being adapted to be gradually reduced on axial movement of the piston during the coupling operation.

4. In means for coupling a driving element with a driven element, a male screw thread adapted to rotate positively with a hollow shaft, a female screw thread adapted for cooperation with said male thread and to rotate positively with the driving element, a totally closed cylinder secured to the driving element and revoluble relative to said hollow shaft, a piston carrying one of the said screw threads and axially movable in said cylinder on rotation of said screw threads relative to one another, a second female screw thread provided on the cylinder, a coupling shaft located within said hollow shaft and adapted for axial sliding movement therein but prevented from rotation relative thereto, resilient means interposed intermediate between said hollow shaft and said coupling shaft, means for coupling said coupling shaft with said driven element, a socket mounted for rotation on the driven element and adapted on axial movement to uncouple the shaft from the coupling shaft, a male screw provided on said socket and cooperating with the said second female thread of the cylinder, means for coupling said socket with said hollow shaft, a gear rim on said socket, a second gear rim on the cylinder, a casing adapted for rotation about said socket, means for arresting said casing, a pinion mounted for rotation in said casing and having two gear rims of different diameters in mesh with the said gear rims, respectively, a passage adapted to ensure communication between the spaces on either side of the piston, and a mass of liquid completely filling up said cylinder, the cross sectional area of said passage being adapted to be gradually reduced on axial movement of the piston during the coupling operation.

5. In means for coupling a driving element with a driven element, a male screw thread adapted to rotate positively with a hollow shaft, a female screw thread adapted for cooperation with said male thread and to rotate positively with the driving element, a totally closed cylinder secured to the driving element and revoluble relative to said hollow shaft, a piston carrying one of the said screw threads and axially movable in said cylinder on rotation of said screw threads relative to one another, a second female screw thread provided on the cylinder, a coupling shaft located within said hollow shaft and adapted for axial sliding movement therein but prevented from rotation relative thereto, resilient means interposed intermediate between said hollow shaft and said coupling shaft, means for coupling said coupling shaft with said driven element, a socket mounted for rotation on the driven element and adapted on axial movement to uncouple the driven shaft from the coupling shaft, a male screw provided on said socket and cooperating with the said second female thread of the cylinder, means for coupling said socket with said hollow shaft, a gear rim on said socket, a second gear rim on the cylinder, a casing adapted for rotation about said socket, means for arresting said casing, a pinion mounted for rotation in said casing and having two gear rims of different diameters in mesh with the said gear rims, respectively, a spring loaded annulus mounted for axial sliding movement on the driven element but prevented from rotation relative thereto, means for coupling said annulus with said socket on the angular speed of the driven element exceeding that of the driving element, a passage adapted to ensure communication between the spaces on either side of the piston, and a mass of liquid completely filling up said cylinder, the cross sectional area of said passage being adapted to be gradually reduced on axial movement of the piston during the coupling operation.

6. In means for coupling a driving element with a driven element, a male and a female screw thread adapted to engage each other and to rotate positively the one with the driving and the other with the driven elements, a totally closed cylinder secured to one of said elements and filled with liquid, a piston carrying one of said screw threads and axially movable in said cylinder on rotation of said screw threads relative to one another, a passage adapted to secure communication between the spaces on either side of the piston, the cross sectional area of said passage being adapted to be gradually reduced on axial movement of the piston, the male and female screw threads being so developed and arranged that the male thread turns out of the female thread when the speed of the driven element exceeds the speed of the driving element.

7. A coupling means as claimed in claim 6 characterized by the provision of a freely rotatable casing, braking means associated with said casing, shafts mounted in said casing, a gear on the driving element, pinions on said shafts in mesh with said gear, and a gear on each of said shafts having a greater number of teeth than the pinion, a toothed rim adapted to be coupled with the driven element and engaged by the last mentioned gears.

BENJAMIN FRANK.